United States Patent
Mäkelä et al.

(10) Patent No.: US 8,694,193 B2
(45) Date of Patent: Apr. 8, 2014

(54) DETERMINATION OF ROUTES FOR ARRANGING AUTOMATIC CONTROL OF MOBILE MINING MACHINE

(75) Inventors: Hannu Mäkelä, Helsinki (FI); Antti Lehtinen, Tampere (FI); Jarkko Ruokojärvi, Tampere (FI); Jouni Sievilä, Vantaa (FI)

(73) Assignee: Sandvik Mining and Construction Oy, Tampere (FI)

( * ) Notice: Subject to any disclaimer, the term of this patent is extended or adjusted under 35 U.S.C. 154(b) by 51 days.

(21) Appl. No.: 13/379,914

(22) PCT Filed: Jun. 22, 2010

(86) PCT No.: PCT/FI2010/050530
§ 371 (c)(1),
(2), (4) Date: Dec. 21, 2011

(87) PCT Pub. No.: WO2010/149853
PCT Pub. Date: Dec. 29, 2010

(65) Prior Publication Data
US 2012/0095639 A1    Apr. 19, 2012

(30) Foreign Application Priority Data

Jun. 24, 2009   (FI) ..................................... 20095713

(51) Int. Cl.
*G05D 1/00*   (2006.01)
*G01C 21/32*  (2006.01)

(52) U.S. Cl.
CPC .................................. *G01C 21/32* (2013.01);
*G05D 2201/021* (2013.01)
USPC ........................................................ 701/25

(58) Field of Classification Search
CPC ........ G01C 21/00; G01C 21/32; G01C 21/34; G05D 2201/021; G05D 1/0212; G05D 2201/0216

USPC ............... 701/1, 2, 23, 25, 26, 410, 413, 424, 701/425, 426, 430; 105/161
See application file for complete search history.

(56) References Cited

U.S. PATENT DOCUMENTS

| | | |
|---|---|---|
| 5,553,407 A | 9/1996 | Stump |
| 5,615,116 A | 3/1997 | Gudat et al. |

(Continued)

FOREIGN PATENT DOCUMENTS

| | | |
|---|---|---|
| CN | 1117749 | 2/1996 |
| CN | 1191594 | 8/1998 |

(Continued)

OTHER PUBLICATIONS

Office Action against Finnish Application No. 20095713, dated Apr. 22, 2010.

(Continued)

*Primary Examiner* — Mary Cheung
(74) *Attorney, Agent, or Firm* — Morgan, Lewis & Bockius LLP (57) ABSTRACT

The present invention relates to a method of determining routes for arranging automatic control of a mobile mining machine. A return route is determined computer-aidedly for the mining machine on the basis of data concerning a route taught by driving by executing, by a data processing device configured for generating return routes, at least the following steps: determining a route identifier for the return route, determining as route points of the return route at least some of the route points of the drive route in a reverse order, wherein when determining route point data of the return route on the basis of the route point data of the drive route, deleting additional control data associated with one or more route points of the drive route, and storing the data determining the return route to be used for automatically controlling the mining machine.

20 Claims, 3 Drawing Sheets

(56) References Cited

U.S. PATENT DOCUMENTS

| | | | |
|---|---|---|---|
| 5,659,985 | A | 8/1997 | Stump |
| 5,671,554 | A | 9/1997 | Geelhoed |
| 5,704,142 | A | 1/1998 | Stump |
| 5,911,775 | A * | 6/1999 | Tanimoto .................. 701/417 |
| 6,016,616 | A | 1/2000 | Geelhoed |
| 6,119,376 | A | 9/2000 | Stump |
| 6,195,922 | B1 | 3/2001 | Stump |
| 6,477,795 | B1 | 11/2002 | Stump |
| 6,701,647 | B2 | 3/2004 | Stump |
| 2006/0069471 | A1 * | 3/2006 | Makela ..................... 701/23 |
| 2006/0069472 | A1 | 3/2006 | Makela |
| 2009/0043439 | A1 * | 2/2009 | Barfoot et al. .............. 701/25 |

FOREIGN PATENT DOCUMENTS

| | | |
|---|---|---|
| JP | 2003-295952 | 10/2003 |
| WO | 2004/085965 | 10/2004 |
| WO | 2004/085966 | 10/2004 |
| WO | 2007/012198 | 2/2007 |
| WO | 2008/060689 | 5/2008 |

OTHER PUBLICATIONS

International Search Report for PCT/FI2010/050530, dated Nov. 25, 2010.

J.M. Roberts, et al.; "Reactive navigation and opportunistic localization for autonomous underground mining vehicles", Information Sciences 145 (2002) 127-146.

A. Vardy; "Long-range visual homing", Proceedings of the 2006 IEEE International Conference on Robotics and Biomimetics, Kunming, China, Dec. 17-20, 2006.

Supplemental European Search report dated Jan. 18, 2013.

Bierden, Elizabeth A., et al., "The Application of Satellite Communications to the Data Link Requirement for Unmanned Ground Vehicles", Robotics and Knowledge Based Systems Workshop, Department of National Defence and the Canadian Space Agency, Jan. 1, 1995, pp. 1-6.

Murphy, Karl, et al., "GPS Aided Retrotraverse for Unmanned Ground Vehicles", SPIE Proceedings, The International Society for Optical Engineering, 2738, Apr. 1, 1996, pp. 133-142.

Notification of the First Office Action (and English translation) for Chinese Application No. 201080028559.5, dated Apr. 1, 2013.

* cited by examiner

DETERMINATION OF ROUTES FOR ARRANGING AUTOMATIC CONTROL OF MOBILE MINING MACHINE

RELATED APPLICATIONS

The present application is a U.S. National Phase Application of International Application No. PCT/FI2010/050530 (filed 22 Jun. 2010) which claims priority to Finnish Application No. 20095713 (filed 24 Jun. 2009).

FIELD OF THE INVENTION

The invention relates to arranging automatic control of mobile mining machines, and particularly to teaching routes for a mining machine in order to arrange automatic control of the mining machine.

BACKGROUND OF THE INVENTION

Various mobile mining machines, such as rock drilling rigs, loading and transport equipment, are used in a mine. The mining machines may be manned or unmanned. The unmanned mining machines may be remote-controlled from a control room, for instance, and they may be provided with measuring devices suitable for location determination. The unmanned mining machines may be controlled to follow a desired route in a mine, provided that the location of the machine can be determined. The location of a machine may be determined by using laser scanners, for instance.

WO 2007/012198 discloses a method of guiding a mining vehicle automatically. By driving the mining vehicle manually or through teleoperation, an operator teaches the mining vehicle a route to follow with no operator intervention involved. U.S. Pat. No. 5,615,116 also discloses a method of automatically navigating vehicles, wherein a route used by a navigation system may have been taught by driving the vehicle or the route may have been determined manually.

Typically, routes are time-consuming to teach since each route to be driven has to be taught by driving a mining vehicle from start to finish of a particular route.

BRIEF DESCRIPTION OF THE INVENTION

An improved solution is now provided for determining routes for mobile mining machines. The solution is characterized by what is disclosed in the independent claims. Some preferred embodiments of the invention are disclosed in the dependent claims.

According to an aspect of the invention, a method is provided which comprises determining a return route for the mining machine computer-aidedly on the basis of data concerning a drive route taught by driving by executing, by a data processing device configured for generating a return route, the following steps: determining a route identifier for the return route, determining as route points of the return route at least some of the route points of the drive route in a reverse order, wherein when determining route point data of the return route on the basis of the route point data of the drive route, deleting additional control data associated with one or more route points of the drive route, and storing the data determining the return route to be used for automatically controlling the mining machine. According to another aspect of the invention, an apparatus implementing this method is provided.

According to an embodiment of the invention, additional control data for at least at one route point, such as bucket position data, are determined for the return route, and control data of an additional function or a reference to determined additional control data are stored in the data of said at least one route point of the return route.

The present invention provides several advantages, which become more apparent in the detailed description. It is now possible to teach an at least partly to-and-fro route used for automatically guiding a mobile mining machine at a single run in one direction, which saves the time necessarily taken when teaching by driving. Typically, one route of a mining machine e.g. from a loading site to an unloading site corresponds with a return route in an opposite direction, so the amount of time saved may be considerable.

BRIEF DESCRIPTION OF THE FIGURES

Some embodiments of the invention are now described in closer detail in connection with some preferred embodiments and with reference to the accompanying drawings, in which.

DETAILED DESCRIPTION OF AN EMBODIMENT OF THE INVENTION

Figure 1:
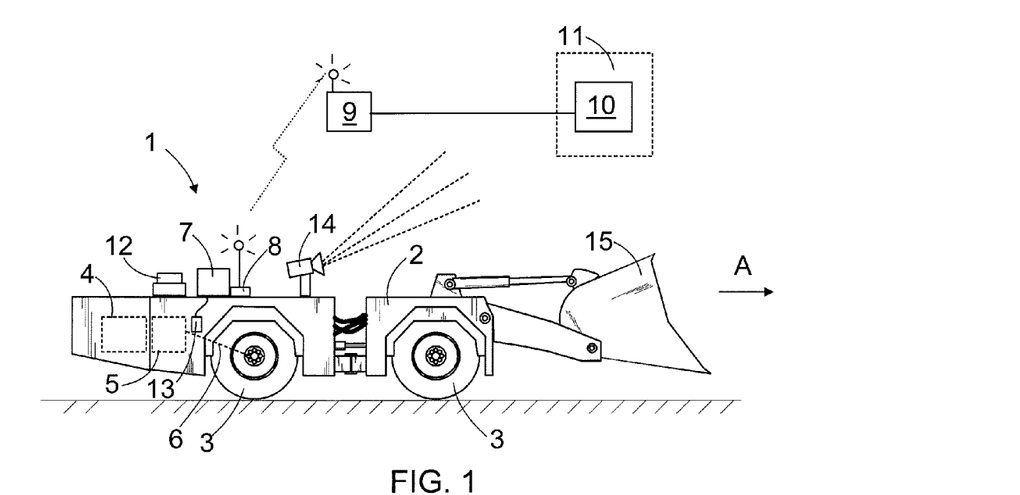
FIG. 1 is a schematic side view showing a mobile mining machine.

FIG. 1 shows a mobile mining machine 1, in this case a loading device, whose front part is provided with a bucket 15 for transporting and loading excavated material. Alternatively, the mining machine 1 may be e.g. a rock drilling rig or transport equipment with a dump box. The mining machine 1 comprises a movable carrier 2 provided with several wheels 3 of which at least one is a drive wheel driven by a motor 4 via transmission. The motor 4 may be an electric motor, combustion engine, hydraulic motor or any other device for generating a rotation torque. The transmission usually includes a gearbox 5 and necessary cardan axles 6, differential gear, and other power transmission members for transmitting the rotation torque from the motor 4 to the drive wheels. The mining machine 1 is further provided with a control system which includes at least a first control unit 7 configured to control actuators in the mining device 1 for controlling and driving the machine.

The mining machine 1 may further be provided with a data transfer unit 8 which enables the first control unit 7 to establish a data transfer connection with a second control unit 10 external to the mining device 1 by utilizing a wireless connection provided by a base station 9. The second control unit 10 may reside in a control room 11, which may be arranged outside the mine. The control units 7, 10 may be computers with appropriate software.

It is to be noted that a mining machine may generally refer to various machines that are used for rock excavation operation in surface or underground production areas and that may also be used in locations other than actual mines. FIG. 1 is a simplified view, and the control system of the mining machine 1 typically comprises several units for executing different control functions. The control system of the mining machine 1 may be decentralized, e.g. an entity consisting of modules connected to a Controller Area Network (CAN) bus and responsible for all measurements and controls of the machine. The information system of the control room 11 may also comprise one or more servers, databases, operator workstations, and a further connection to other networks and systems.

The control system of the mining machine 1 comprises a positioning system or unit. According to an embodiment, the positioning system comprises at least one gyroscope 12 which enables the direction of the machine to be determined accurately for positioning. The positioning system further comprises means for determining a distance travelled by the machine 1. For instance, one or more sensors 13 may be used for measuring rotation of a wheel 3. On the basis of the measurement data, the positioning system determines the rotational movement of the wheel and then calculates the magnitude of distance travelled by the machine. The positioning system may further comprise one or more scanners 14, e.g. a laser scanner or a corresponding device, for scanning the space surrounding the mining machine 1 and the geometry of that space.

Figure 2:
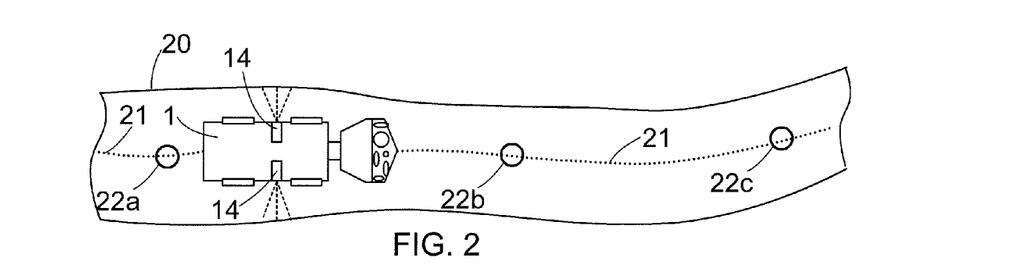
FIG. 2 is a top view illustrating an arrangement for positioning and guiding the mining machine according to an embodiment.

FIG. 2 shows a principle of determination and use of a route based on scanning and to be used in positioning according to an embodiment. One or both sides of the mining machine 1 may be provided with laser scanners 14 which enable the profile and surface contours of a mine tunnel 20 to be determined.

A route 21 of the mining machine 1 may be generated by teaching. In such a case, the mining machine 1 is driven by manual control along a desired route and, on the basis of position data obtained on the basis of scanning data processing, route points 22a, 22b, 22c are determined for the route 21 into the memory at determined intervals. After the desired route 21 has been taught and stored in the memory of the control system, the mining machine 1 may be guided to follow the route 21 autonomically. During automatic control, the location of the mobile mining machine 1 may be determined e.g. by using the laser scanners 14. The laser scanners scan the wall profiles of the tunnel in order to determine the position on the basis of a pre-stored environment model, which means that any separate tags, such as reflectors or radio frequency tags, become redundant on the walls of the tunnel. On the basis of the determined position and route point data of the route, the control system controls the travel of the mining machine such that the mining machine stays on the route 21.

Figure 3:
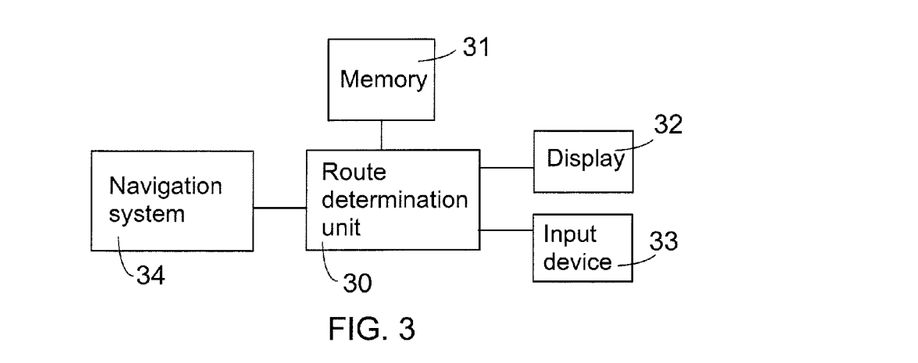
FIG. 3 illustrates an apparatus according to an embodiment for determining routes of a mining machine.

FIG. 3 illustrates an apparatus according to an embodiment for determining routes of a mining machine, e.g. for the mining machine 1 illustrated in FIG. 1. The apparatus comprises at least a unit 30 for determining routes, and particularly for determining to-and-fro routes by utilizing features to be illustrated in the following. The route determination unit 30 executes at least one route determination algorithm which, for an at least partial return route of an already determined route, determines route points and control data specific thereto by employing at least some of the already determined route point data of the (forward) drive route. The route determination algorithm is configured such that route point data of a return route may be determined without position data provided by a navigation system of the mining machine for determining a drive route which may have been taught by conventional means.

The route determination unit 30 may be implemented e.g. by a general-purpose processor of a data processing device, on which one or more computer programs executing route determination procedures are run. The computer program comprises code for executing at least some of the features related to route determination and to be illustrated in the following in connection with FIGS. 4 and 5. The computer program may be stored on a computer-readable storage medium, such as a memory 31 or a separate memory medium, wherefrom the computer program may be retrieved to be run by the processor.

The route determination unit 30 is connected to the memory 31 in which various data used for route determination, such as an environment model, a route, data of the properties of the mining machine, and other data and settings affecting route determination, may be stored. The route determination unit comprises an access interface for a display 32, and at least one access interface for at least one input device 33, such as a keyboard and/or mouse. The apparatus may also have one or more other interfaces to other systems. The apparatus typically comprises at least one data transfer unit which may utilize e.g. standard Transport Control Protocol/Internet Protocol (TCP/IP) based network protocols.

The route determination unit 30 is operationally connectable to a positioning system 34 which determines the position of the mining machine 1 during its run. The positioning system 34 may be part of a navigation system executed by the mobile mining machine 1, e.g. the control unit 7, and possibly partly also by a control unit 10 external to the mining machine.

The route determination unit 30 may be implemented e.g. in an operator workstation. However, the route determination unit 30 determining a return route does not have to be implemented in the data processing apparatus used for controlling the mining operation, or necessarily even connectable thereto, so successful route determination is not bound to any particular place or apparatus. It is to be noted, however, that it is possible to implement at least some of the present technical features related to route determination, e.g. at least some functions of the route determination unit 30, in the mobile mining machine 1 and the data processing apparatus thereof.

The apparatus implementing at least the route determination unit 30 may as such be provided by different appropriately configured data processing devices. A software application implementing the route determination unit 30 may be stored e.g. in a portable computer from which the route data may be transferred to the control unit 10 in the control room e.g. via a data transfer connection provided by the data transfer unit included in the apparatus or by using a memory medium.

The system may further be provided with a specific drive task management system, e.g. an application to be executed at the control unit 10 located in the control room 11. The drive task management system determines drive task on the basis of inputs received from a user of the system, e.g. an operator or a designer thereof, and transmits drive task data to the control unit 7 of the mining machine 1. Referring to FIG. 3, the drive task management system may be connected to the memory 31, and it may retrieve pre-stored route data from the memory and forward route data and/or control commands to the control unit 7 or the navigation system of the mobile mining machine 1.

Figure 4:
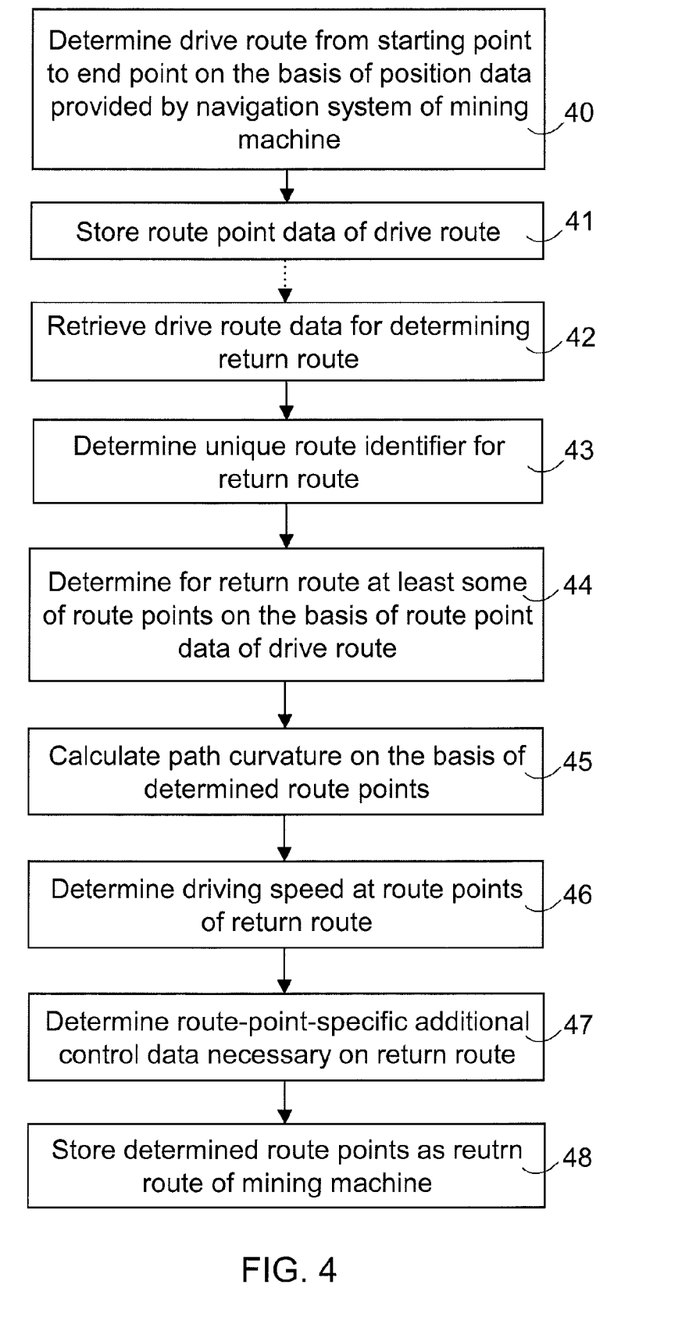
FIG. 4 shows a method according to an embodiment.

FIG. 4 shows a method according to an embodiment which may be executed in the route determination unit 30 illustrated in FIG. 3, for instance. Step 40 illustrates how a route is being taught while driving the mining machine from a starting point to an end point. Step 40 may be implemented on the basis of position data received from the navigation system in a manner already illustrated above. A route is determined by a starting point, an end point, and a suitable number of route points therebetween. According to an embodiment, a route may be determined by a plurality of separate segments, each comprising a plurality of route points. Data of the route points determined for the route are stored in step 41 as associated with a given identifier of the route. The data may be stored on any memory medium 31, e.g. in a database of a control system of a mine.

When a need exists to determine a return route by using at least some of the route points of a previously determined (forward) drive route, the stored route data are retrieved 42. The route data comprise at least the position data of each route point of the route, but they may also include other route-point-specific or route-point-set-specific control data, such as speed data, gear data, steering angle data, data of the position of a boom or a lifting arm possibly provided in a mining machine, and data of the position of a possible bucket. The need to retrieve 42 the route data may emerge immediately after the route has been taught. In such a case, the process may directly proceed from step 41 or even from step 40 to step 42 in order to be able to immediately determine a to-and-fro run from the starting point to the end point. It is to be noted, however, that the process may proceed to step 42 also in other situations, e.g. when a new route, which is partly reverse with respect to the already determined route, is added later. The return route is provided 43 with a route identifier of its own, and the route points to be determined for the return route are associated with this unique route identifier.

In order to determine a return route, the process may start to process the route points of the drive route in a reverse order, i.e. the process may first retrieve from among the route points of the route the data of the last route point to be used for the return route. In step 44, the starting point and at least some of the route points are determined for the return route. If the return route starts precisely at the end point of the route, the coordinates of the end point of the route may be directly determined as the first route point of the return route, i.e. as the starting point of the return route. On the basis of a user's input or the setting of the route determination application, it is, however, possible to determine a first point of the return route that may slightly or substantially differ from the end point of the route. The first route point of the return route may be e.g. the third last route point of the route or a new route point undetermined in the route data. In connection with step 44, it is also possible to determine other control data for the return route, such as modify, delete and/or add data of one or more route points with respect to the data concerning the route points of the original route.

FIG. 4 illustrates an embodiment wherein in step 44, position data are determined for each route point of the return route being determined. The position data may simply determine the x and y coordinates of the points in a given standard system of coordinates. In step 44, the route point position data may be directly copied from the position data of the route points of the drive route.

On the basis of the determined route points of the return route, a path curvature is determined 45 for the path determined by the route points. The path curvature enables the driving speed to be determined 46 route-point-specifically.

It is to be noted that the route determination algorithm may be configured to execute also other procedures in steps 44 to 46, e.g. to determine a steering angle route-point-specifically. The route determination unit 30 may be configured to calculate the amount of space the mining machine needs around it with the steering angle position necessary at a particular route point on the basis of data concerning the external dimensions and/or kinematics of the machine. After the space required by the mining machine has been determined, for each route point the route determination unit may check if a predetermined minimum distance is provided between the machine and the walls. When necessary, the position of a route point may be changed.

The route determination unit 30 may also be configured to optimize the position of the route points. The route determination algorithm may be configured to calculate a route such that a machine on the route always keeps a given minimum distance from both walls, provided that the maximum path curvature does not exceed the given limit and, on the other hand, a rate of change of the path curvature is minimized. In such a case, the driving speed of the machine may be adapted 46 to be as high as possible. A more detailed method is disclosed in WO2004/085966, the description of route points and generation thereof illustrated in connection with 3 to 5 therein being incorporated herein by reference.

According to an embodiment, additional control data for at least at one route point on a return route are determined for the return route, which is illustrated in step 47. These additional control data may be added automatically or in response to a user's input. Typically, such additional control data are mining-machine-specific or mining-machine-type-specific. An example of such data separately associated with one or more route points of the return route is bucket position data. Some other examples include gear data, steering angle data, and data of the position of a boom or a lifting arm possibly provided in a mining machine. For instance, necessary control data concerning loading and unloading the bucket 15 of the mining machine 1 may also be included in the return route data. This function may be implemented e.g. as part of step 44 of FIG. 4. It is to be noted that according to an embodiment, it is possible to utilize additional control data that have already been determined previously, e.g. an already stored data file determining a model for the movement of the bucket. It is to be noted, however, that the return route determination unit 30 may be configured to determine, in the return route data, the data of the route points of only the route to be driven as illustrated in steps 42 to 46, with no additional control data determination illustrated in step 47.

In step 48, the data determining the return route are stored to be used for automatically guiding the mining machine. The data concerning the return route may be stored e.g. in the memory 31, into connection with the route data. A return route identifier may be provided e.g. in the title of the data file comprising the return route determining data, or as a predetermined field in the data file. Alternatively, route points are stored as they become determined. Possible additional control data determined for one or more route points may also be stored in step 48. It is to be noted that the additional function control data may be stored as such, or only a reference to the determined additional function control data may be stored.

It is to be noted that FIG. 4 only illustrates, in a simplified manner, one particular embodiment, and the invention may be implemented in many different ways. Some complementary or alternative embodiments are disclosed in the following. It is also to be noted that the terms "starting point" and "end point" are to be understood broadly to refer to the starting point and the end point of a procedure of teaching a route, and it is not necessary for a task of the mining machine using the determined route and return route to start at the starting point. Consequently, a route that was taught first may in reality be a route the mining machine follows when returning e.g. to its waiting area or to the bucket unloading area.

In addition to the steps illustrated in FIG. 4, after step 47 the method may comprise a step of checking if an end point set for the return route is reached. The end point may automatically be the starting point of the route, a point in the vicinity thereof, or a point possibly inputted by a user and located entirely differently. If the end point of the return route was not reached, the method returns to step 44 to determine at least some of the remaining route points on the basis of suitable route point data of the drive route.

According to an embodiment different from that of FIG. 4, route data are retrieved in part, e.g. a route point or a segment at a time, and as necessary when determining the return route e.g. in connection with step 44.

According to yet another embodiment different from that of FIG. 4, the route point data of the return route are determined on the basis of route point data copied from the drive route data such that first, the order of the route points is reversed for the return route. The additional control data associated with one or more route points on the drive route and provided for controlling a particular additional function, such as control data for loading and/or unloading a bucket, are deleted. The route point data complemented with return-route-specific control data may then be stored as a data file determining the return route. At least a driving speed may be calculated for the route points of the return route e.g. as illustrated in connection with FIG. 4. It is to be noted, however, that also the driving speed may be determined for the route points of the return route according to the driving speeds of the route points of the route.

In addition to step 44, the method may comprise a step of determining a necessary number of additional route points. For various reasons, a return route may need additional route points, and the route determination algorithm may be configured to add additional route points in response to a user's input or automatically when a predetermined criterion is met.

According to an embodiment, the route points of the route are only partially used for determining the route points of the return route, i.e. the return route comprises only some of the route points of the route. This enables the already stored routes to be utilized for determining new routes by applying at least partially the same route points. Thus, the presently used term "return route" is to be understood broadly, and it is not necessarily by any means bound to the route on the basis of whose route point data it is determined. Consequently, in addition to the steps of FIG. 4, more route points may be determined in the return route in response to a user's input or e.g. on the basis of the route point data of another, already stored route.

Figure 5:
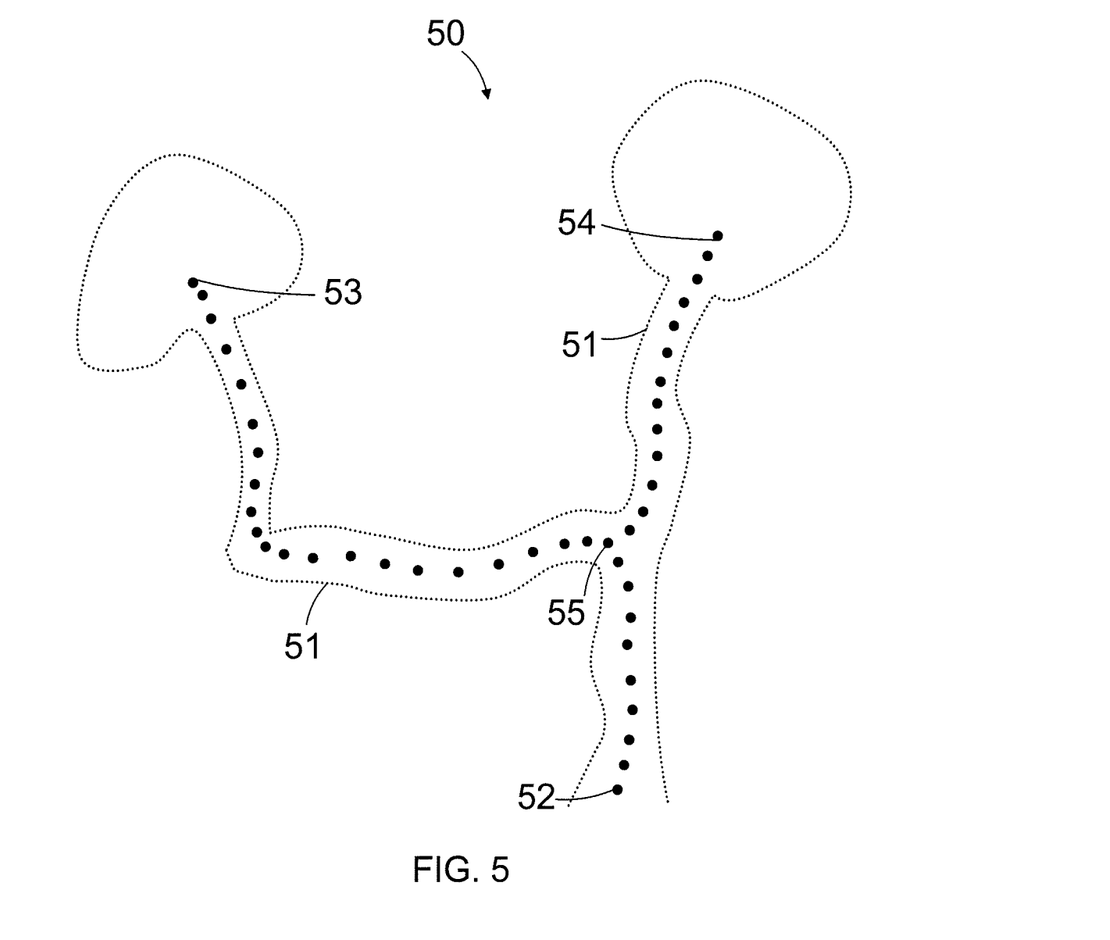
FIG. 5 illustrates routes determined in a model describing a production area.

FIG. 5 illustrates a model of a part 50 of a production area, showing locations of walls 51 illustrated in a broken line. A route proceeding from point 52 to point 53 may first have been determined as a one-way route taught by driving. A corresponding, completely reverse return route from point 52 to point 53 may have been taught by utilizing the features illustrated in steps 42 to 48 of FIG. 4. Furthermore, a partial return route may have been determined from point 52 via point 55 to point 54. For this partial return route, data of points 52, 55 of the route and the route points therebetween may have been utilized in the above-illustrated manner and necessary route points from point 55 to point 54 may have been added.

According to an embodiment, a specific eXtensible Markup Language (XML) based data file is determined for the return route, which comprises a route point element for each route point determined for the return route on the basis of the route data. The route point element determines the coordinates of a route point and possible complementary data for controlling a mining machine at the route point, e.g. a turning angle and speed.

According to an embodiment, routes are determined as interconnected route sections, i.e. segments, each being provided with an identifier code of its own. For each segment, in turn, when desired, it is possible to determine limit values for driving speeds and other functions, determined according to the properties of a particular segment. These specifications may be provided even mining-machine-specifically, taking the properties of each mining machine into account. The route determination unit 30 may be configured as illustrated above to determine segment-specific data, i.e. at its simplest, data of the route points in each segment and the identifier code of the segment. Steps 44 to 47 of FIG. 4, for instance, may be executed segment-specifically, i.e. such that the route points of one segment of the route are determined at a time. The segment-specific data may be stored to be ready in the memory of the control apparatus of the mining machine 1, in which case the route determination takes place simply by only transmitting a list of the identifier codes of the segments of the route related to a particular task. Such segment-based route determination is described in more detail in WO2004/085965, which is incorporated herein by reference.

The route of the mining machine 1 often ends at a point which is a reversal point, i.e. the driving direction of the mining machine 1 is reversed and the return route is driven in an opposite direction e.g. at a driving speed having a minus sign. At the reversal point, a front axle changes, in which case in the teaching based on driving exclusively, the task of selecting points to be taught was changed from one axle to another, and a gap having the length of an axle spacing was created in the route. Previously, this gap was manually provided with points such that the starting point of the segment of the return route was substantially the same as the last point of the ending segment. The present solution enables the reversal to be implemented in one segment and the outward and return sections to be implemented at the reversal point automatically correctly, i.e. the outward route can be made to end at exactly the same point at which the return route begins.

According to an embodiment, the return route generated in the above-described manner may be tested in a computerized manner by utilizing simulation. A computer program executing a testing application retrieves or determines a mining machine simulation model and the data of the route to be tested, i.e. the data concerning the route points of the route. The testing application may be executed by the route determination unit 30, e.g. as a part of a route determination tool. The testing application drives a computer model describing the mining machine on the route being tested. The movement of the mining machine may be illustrated to the user on a mine map generated on the basis of an environment model or in a model of another type describing the production area. It is possible to show the user the amount of space left around the machine in each part of the route. Alternatively, the program calculates the space left between the machine and the wall on the route and informs the user of possible points at which the minimum distance is not exceeded. This embodiment enables the time necessary for testing a route to be shortened or the testing of a route by driving the mining machine 1 to be even avoided completely. Such computerized route testing provides additional safety e.g. in an embodiment wherein no driving speeds are separately calculated for the return route and it is no longer necessary to separately drive the mining machine on the basis of the route data in order to test the determined return route.

It is apparent to one skilled in the art that as technology advances, the basic idea of the invention may be implemented in many different ways. The invention and its embodiments are thus not restricted to the above-described embodiments but they may vary within the scope of the claims. Different features may thus be left out, modified, or replaced by equivalents, and the features set forth in the present application may be combined so as to provide various combinations.

The invention claimed is:

1. A method of determining routes for arranging automatic control of a mobile mining machine, the method comprising teaching to the mining machine, for the purpose of performing a task, a drive route by driving the mining machine from a starting point of the drive route to an end point thereof, wherein the method further comprises:
   determining a return route for the mining machine computer-aidedly on the basis of data concerning said drive route taught by driving by executing, by a data processing device configured for generating the return route, the following steps:
   determining a route identifier for the return route,
   determining as route points of the return route at least some of the route points of the drive route in a reverse order, wherein when determining route point data of the return route on the basis of the route point data of the drive route, deleting additional control data associated with one or more route points of the drive route,
   adding to the return route additional control data, the additional control data including control data that differs from control data associated with one or more route points of the drive route, and
   storing the data determining the return route and the additional control data to be used for automatically controlling the mining machine.

2. A method as claimed in claim 1, wherein additional control data for at least at one route point of the return route includes at least one of bucket position data, gear data, steering angle data, and data of a position of a boom or lifting arm.

3. A method as claimed in claim 1, comprising determining the data of the route points of the return route on the basis of route point data copied from the drive route by determining, as position data of the route points of the return route, position data of the route points of the drive route in a reverse order with respect to the route points of the drive route, by deleting the bucket position data associated with one or more route points of the drive route, and by storing the route point data as a data file determining the return route.

4. A method as claimed in claim 1, comprising determining a curvature for the path determined by a set of route points of the return route, and
   determining a speed for each route point of the return route on the basis of the determined path curvature.

5. A method as claimed in claim 1, comprising adding to the return route at least one new route point by determining the position of the route point on the basis of a user's input and an environment model.

6. An apparatus comprising a data processing device for determining route data for automatically controlling a mobile mining machine, wherein to the mining machine for carrying out a task a drive route is taught by driving the mining machine from a starting point of the drive route to an end point thereof wherein the data processing device is configured to determine a return route for the mining machine computer-aidedly on the basis of data concerning the drive route computer-aidedly, the data processing device being configured to:
   determine a route identifier for the return route,
   determine as route points of the return route at least some of the route points of the drive route in a reverse order, wherein when determining route point data of the return route on the basis of the route point data of the drive route, additional control data associated with one or more route points of the route are deleted,
   add to the return route additional control data, the additional control data including control data that differs from control data associated with one or more route points of the drive route, and
   store the data determining the return route and the additional control data to be used for automatically controlling the mining machine.

7. An apparatus as claimed in claim 6, wherein additional control data for at least at one route point of the return route includes at least one of bucket position data, gear data, steering angle data, and data of a position of a boom or lifting arm.

8. An apparatus as claimed in claim 7, wherein the apparatus is configured to determine data of the route points of the return route on the basis of route data copied from the drive route by determining, as position data of the route points of the return route, position data of the route points of the drive route in a reverse order with respect to the route points of the drive route, by deleting the bucket position data associated with one or more route points of the drive route, and by storing the route point data as a data file determining the return route.

9. An apparatus as claimed in claim 8, wherein the apparatus is configured to determine a curvature for the path determined by a set of route points of the return route, and
   the apparatus is configured to determine a speed for each route point of the return route on the basis of the determined path curvature.

10. An apparatus as claimed in claim 8, wherein the apparatus is configured to add to the return route at least one new route point by determining the position of the route point on the basis of a user's input and an environment model.

11. An apparatus as claimed in claim 7, wherein the apparatus is configured to determine a curvature for the path determined by a set of route points of the return route, and
    the apparatus is configured to determine a speed for each route point of the return route on the basis of the determined path curvature.

12. An apparatus as claimed in claim 7, wherein the apparatus is configured to add to the return route at least one new route point by determining the position of the route point on the basis of a user's input and an environment model.

13. An apparatus as claimed in claim 6, wherein the apparatus is configured to determine data of the route points of the return route on the basis of route data copied from the drive route by determining,. as position data of the route points of the return route, position data of the route points of the drive route in a reverse order with respect to the route points of the drive route, by deleting the bucket position data associated with one or more route points of the drive route, and by storing the route point data as a data file determining the return route.

14. An apparatus as claimed in claim 13, wherein the apparatus is configured to determine a curvature for the path determined by a set of route points of the return route, and
    the apparatus is configured to determine a speed for each route point of the return route on the basis of the determined path curvature.

15. An apparatus as claimed in claim 13, wherein the apparatus is configured to add to the return route at least one new route point by determining the position of the route point on the basis of a user's input and an environment model.

16. An apparatus as claimed in claim 6, wherein the apparatus is configured to determine a curvature for the path determined by a set of route points of the return route, and
    the apparatus is configured to determine a speed for each route point of the return route on the basis of the determined path curvature.

17. An apparatus as claimed in claim 16, wherein the apparatus is configured to add to the return route at least one new route point by determining the position of the route point on the basis of a user's input and an environment model.

18. An apparatus as claimed in claim 6, wherein the apparatus is configured to add to the return route at least one new route point by determining the position of the route point on the basis of a user's input and an environment model.

19. An apparatus according to claim 6, wherein the apparatus is a mine device.

20. A non-transitory computer-readable medium comprising:
   a computer program for controlling a processing unit,
   wherein the computer program comprises instructions for execution by the processing unit that determine a return route for a mining machine based on data from a drive route,
   wherein the instructions comprise the following steps:
   determining a route identifier for the return route,
   determining as route points of the return route at least some route points of the drive route in a reverse order, wherein when determining route point data of the return route on the basis of route point data of the drive route, deleting additional control data associated with one or more route points of the drive route,
   adding to the return route additional control data, the additional control data including control data that differs from control data associated with one or more route points of the drive route, and
   storing the data determining the return route to be used for automatically controlling the mining machine.

* * * * *